Jan. 19, 1960  J. J. CASEY  2,921,892
APPARATUS AND PROCESS FOR CONDUCTING CHEMICAL REACTIONS
Filed Dec. 8, 1954  2 Sheets-Sheet 1
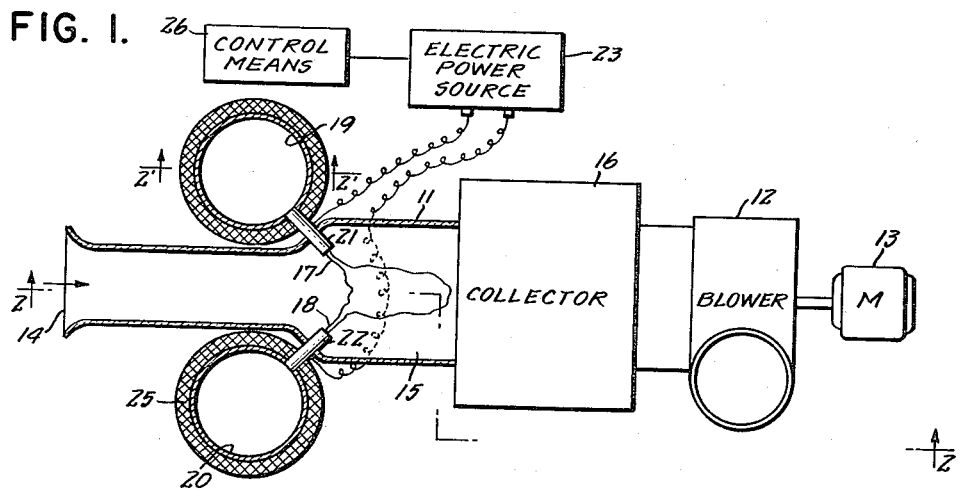
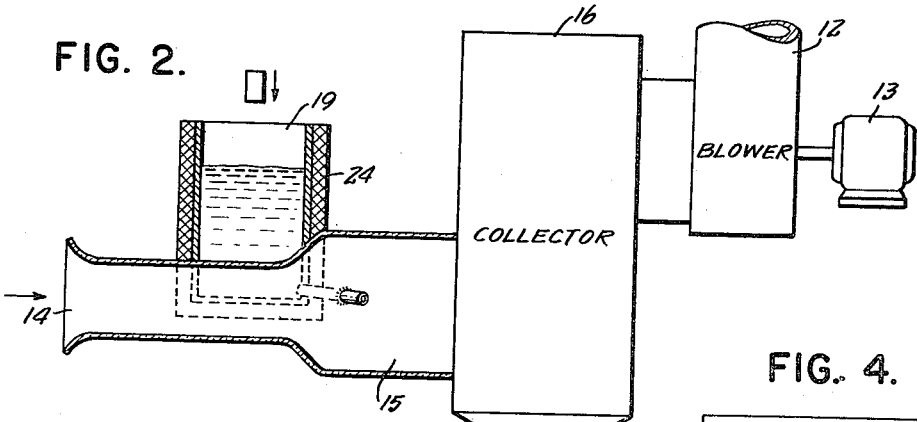
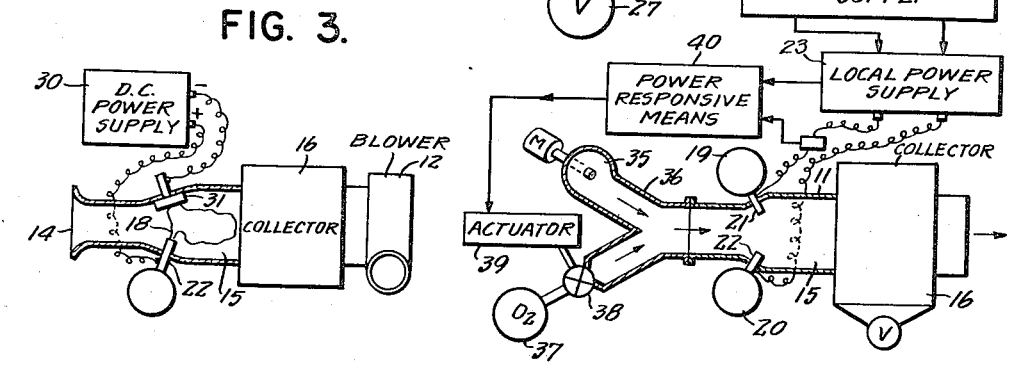
INVENTOR
JOSEPH J. CASEY
BY
ATTORNEYS Jan. 19, 1960          J. J. CASEY          2,921,892
APPARATUS AND PROCESS FOR CONDUCTING CHEMICAL REACTIONS
Filed Dec. 8, 1954          2 Sheets-Sheet 2

INVENTOR
JOSEPH J. CASEY
BY
*Mitchell + Bechert*
ATTORNEYS

United States Patent Office 2,921,892
Patented Jan. 19, 1960

2,921,892

APPARATUS AND PROCESS FOR CONDUCTING CHEMICAL REACTIONS

Joseph J. Casey, Shelbyville, Tenn., assignor, by mesne assignments, to Amalgamated Growth Industries, Inc., New York, N.Y., a corporation of Delaware Application December 8, 1954, Serial No. 473,941

44 Claims. (Cl. 204—164)

My invention relates to a method and means for conducting chemical reactions at elevated temperatures created by electrical arcs.

It is an object of the invention to provide improved methods and means of the character indicated.

It is another object to provide a high-temperature electric-arc reactor in which at least one of the electrodes is completely consumed as part of a continuous process.

It is also an object to provide an electric-arc reaction process in which the materials of two electrodes are completely consumed in operation of the process.

Still another object is to provide an electric-arc reaction process in which the material of one electrode is reacted with an additional material in the reaction zone.

It is a further object to provide methods and means whereby reactions involving consumption of electrodes in an electric arc may be stabilized.

Another object is to provide an improved chemical reactor in which the reaction zone is defined by such localized high-heat development that the reactor walls need not be subjected to the more elevated heats developed in the reactor.

It is a specific object to provide means for producing finely comminuted metal oxides.

It is another specific object to provide methods and means meeting the above objects and additionally assuring purity of product by reason of complete reaction of the electrode or electrodes.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a plan view showing a simplified arrangement of elements used in one embodiment of my invention, certain parts of the diagram being shown in horizontal section;

Fig. 2 is a side elevation of the parts of Fig. 1, certain parts being shown in section in the plane 2—2 of Fig. 1, and certain other parts being in the plane 2'—2' of Fig. 1; and Figs. 3 to 10 are simplified diagrams generally similar to Fig. 1 but illustrating various modifications.

Figure 5:
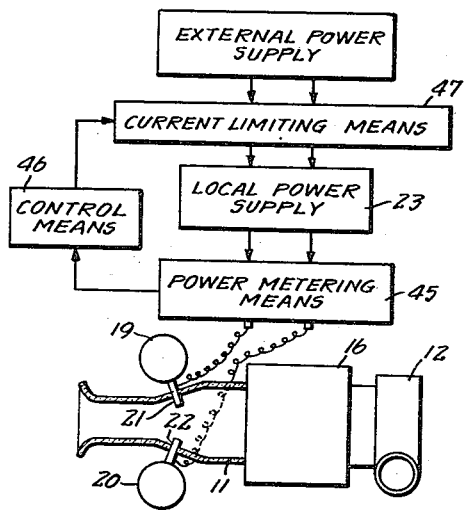

Briefly stated, my invention contemplates an improved method and means for the conduct of chemical reactions at elevated temperatures while assuring control of the reaction and purity of product. The elevated temperatures are achieved by establishing a continuous electric arc between two or more electrodes, and the material of at least one electrode is completely consumed in the reaction. Such material is supplied to the reaction zone as a free liquid stream, and in the case of metals the molten state must first be created. The liquid-electrode material may comprise a mixture of several materials to be reacted with each other, reliance being had on the temperature of the arc itself to achieve the reaction; alternately, a further material, such as a gas, may be introduced into the reaction zone, for reaction with the arc-vaporized particles of the liquid electrode. In other arrangements, plural streams of the same or of different conductive liquids constitute electrodes between which an arc is struck, for the purpose of reacting the materials of the electrodes with each other or with additional materials fed into the arc zone. Various automatic arc-stabilizing arrangements, responsive to energy level of the arc, are shown and described.

Referring to Figs. 1 and 2, my invention is shown in application to apparatus having specific utility in the production of certain finely comminuted metal oxides, such as litharge (lead oxide) and zinc oxide. The reactor may be of any shape convenient to the particular process to be carried out and, in the form shown, the reactor 11 is an elongated envelope which is generally tubular, in order to permit a continuous flow of gas, such as air, therethrough. In the form shown, a suction blower 12, driven by a motor 13, continuously induces a down-draft of air from the inlet 14, past the reaction zone 15, to a suitable collector 16 for the products of the reaction.

The electrodes between which the electric arc is developed are free liquid streams, suggested at 17—18, of material capable of conducting electric current. The material for the stream 17 is supplied from a first reservoir 19, while that for the stream 18 is supplied from a second reservoir 20, electrically insulated from reservoir 19. Discharge passages or nozzles 21—22 feed the respective liquids to the reaction zone; this may be done near or through the inlet 14, but in the form shown, the nozzles 21—22 pass directly through the envelope 11. I prefer that the electrodes (that is, the free streams 17—18) be generally directed toward each other and downstream, in the sense of the continuous draft induced through inlet 14 by blower 12. Arc power may be available from a suitable source 23 having electrical connection to the streams 17—18. Such connection may be established by immersing suitable contacts in the reservoirs 19—20, but, in the form shown, I simply show electrical connection to conductive nozzles 21—22. For the case in which the conductive electrode material is not liquid at room temperatures, I provide heating means 24—25 for the respective reservoirs, to assure free flow to the reaction zone.

In operation, as for the production of metal oxides, the same or different metals may be maintained in the liquid state in the reservoirs 19—20, depending upon whether single or mixed oxides are to be produced. When the electrode materials are in the liquid state, valve means (not shown) may be operated to release a flow through the nozzles 21—22, and by manipulation of control means 26 a desired level of arcing power may be developed between the streams. The air induced at 14 may contain sufficient oxygen for conducting the desired reaction, and may also perform the function of cooling the products of reaction. The temperature of the arc is so elevated that the metal is rapidly vaporized into molecular or near-molecular state for reaction with the oxygen in the air, and an extremely finely divided product is available for collection at 16. The collector 16 may be one of several commercially available types and, from time to time, valve means 27 associated therewith may be manipulated to discharge accumulations of oxide.

In Fig. 3, the apparatus is much the same as in Figs. 1 and 2, and therefore corresponding parts have been given the same reference numerals. In Fig. 3, however, the electric power for developing the arc is direct current, as supplied at 30. Since the current is direct, the cathode electrode need not be eroded or caused to react in the zone 15. This simplifies the construction for the conduct of certain reactions, so that but one reservoir 20, with associated nozzle 22, is needed. The arc then develops between the free stream 18 and the solid cathode 31, which is preferably of large area and inert, as of carbon. In the apparatus of Fig. 3, the materials to be reacted may thus be contained completely in the liquid issuing from the reservoir 20, reliance being had on the heat of the arc to carry the reaction. Alternatively, the material in the reservoir 20 may be reacted with a further material supplied to the reaction zone, as in the case of oxygen or air introduced by way of the inlet 14. Although D.-C. is preferable for this type of reaction, it should also be understood that A.-C. or a combination of A.-C. and D.-C. can be likewise employed, provided only that the current density across the inert electrode be low enough (meaning that the inert electrode area exposed to the arc is relatively large) to prevent appreciable erosion of the inert electrode and that the current density across the liquid electrode be high enough (meaning that the cross-section of the nozzle is relatively small at the discharge end, compared to the effective area of the inert electrode) to provide the desired degree of electrode consumption.

In connection with Fig. 3, it will be understood that in place of the solid electrode 31, a pool of molten metal may be used as one electrode, the arc being established between such pool and the stream issuing from the nozzle 22.

The arrangement of Fig. 4 is generally similar to that of Fig. 1, except that, instead of a suction draft through the reaction chamber 11, a forced down-draft is established by pump means 35 connected to the inlet 36. Also available for supply to the reaction zone is a gas reservoir 37, which (for the case of oxide production) may be a tank of oxygen connected by suitable valve means 38 to the inlet 36. I have found in practice that the power consumed by the arc may fluctuate with wide excursions, depending upon the oxygen presented to the reaction zone, particularly when the oxygen is raw, as supplied by means 38. Therefore, in Fig. 4, I show automatic control means for the valve actuator 39. The control for actuator 39 may be achieved by energy-level responsive (or power-responsive) means 40 constantly monitoring the power in the electric-arc circuit. Depending upon the materials to be reacted, it may on the one hand be desirable to increase the supply of oxygen with detected increases in arc power, thereby achieving a directly proportional type of control, or on the other hand to decrease the supply of oxygen at 38 with detected increases in power consumption, so as to prevent a reaction from getting out of hand. It will be understood that the schematic showing in Fig. 4 is sufficiently suggestive of either type of control.

In Fig. 5, I show another means for stabilizing a reaction within a reactor of the character indicated. In the case of Fig. 5, the control is completely electrical and operates on the power supply to the arc electrodes. Control is achieved simply by means 45 responsive to detected deviations from a given desired constant-power level and in operating relation with control means 46 for a current-limiting device 47 in the supply line.

Figure 6:
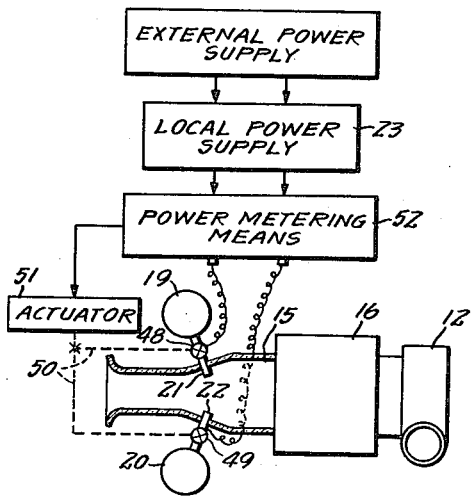

In Fig. 6, I show how a reaction may be controlled by automatically regulating the flow in one or both of the free streams directed into the reaction zone 15. In the form shown, control in both nozzles is suggested by valve means 48—49, which may be independently actuated but which are shown ganged by means 50 to an actuator 51. The actuator 51 may be operated by means 52 responsive to the power level in the arc circuit.

Figure 7:
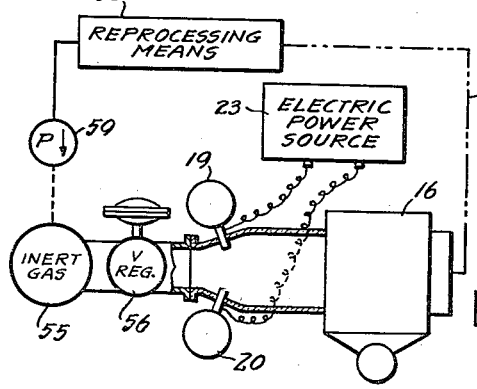

In Fig. 7, I illustrate a specific case in which the materials supplied from the respective reservoirs 19—20 are themselves sufficient for the reaction. The reaction may thus take place in the presence of an inert gas, shown supplied from a pressurized reservoir 55 and regulated by means 56 to assure a desired uniform flow. The dotted line 57 suggests that, after the reaction products have been collected at 16, the inert gas (exhausted after collection of the reaction products) may be captured and return to the supply reservoir 55. If necessary, this captured gas may be reprocessed at 58 and returned to the supply 55 by pressurizing means 59.

Figure 8:
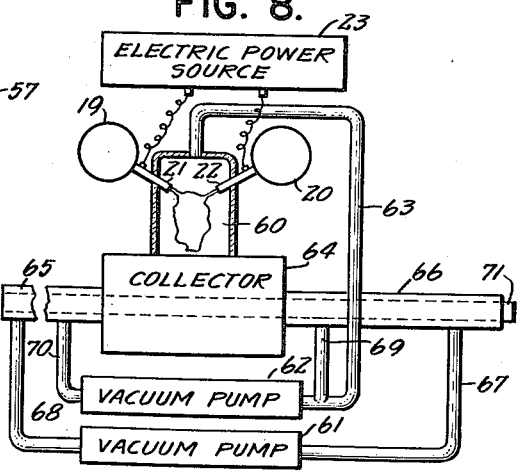

In Fig. 8, I illustrate another means whereby my method may be conducted to achieve reaction only between materials issuing from the reservoirs 19—20. In Fig. 8, the reaction chamber 60 is continuously evacuated. The evacuating system may be single-stage, but in the form shown comprises two stages 61—62, the second stage 62 of which is shown directly evacuating the chamber 60 through the line 63. The collector 64 will, of course, also be subjected to a vacuum, and I have shown elongated means 65—66 projecting out, both ends of the collector 64, for assisting in the continuous or periodic removal of reaction products from collector 64. The removal means 65—66 may comprise adjacent elongated manifolds served respectively by the pipes 67—68 connected to the first-stage pump 61, and by the pipes 69—70 connected to the second-stage pump 62. In the form shown, an elongated rod or other member 71, closely fitting the manifolds served by the pumps 61—62, is sufficiently longitudinally removable to permit exposure of collected reaction products without breaking the vacuum. The arc reaction may thus proceed uninterrupted and reaction products may be removed continuously or from time to time.

Figure 9:
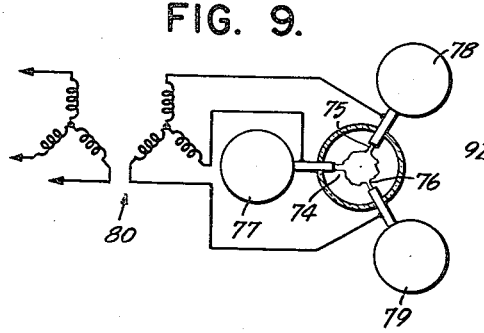

In Fig. 9, I schematically indicate that my invention is not limited merely to a single-liquid-electrode system or to a two-liquid-electrode system, for in Fig. 9 I show three electrodes 74—75—76, being three streams of conductive material (such as molten metal) issuing from the three insulated reservoirs 77—78—79, respectively. The arcing potentials may be developed from a three-phase electrical supply 80 connected to the electrodes in the manner described for other forms.

Figure 10:
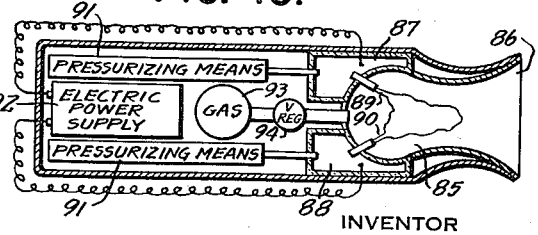

In Fig. 10, I schematically indicate that my process, involving complete consumption of liquid electrodes, is directly applicable to thrust-developing devices, and for this purpose I show a thrust motor having a reaction chamber 85 with an exhaust nozzle 86, for discharge of exhaust products into the atmosphere, so that thrust in the forward direction (i.e., right-to-left, in the sense of the drawing) may be developed. The liquid or liquids to be consumed in the reaction are stored in suitable reservoirs 87—88, which for preheating purposes may be immediately adjacent an inner wall of the reaction chamber 85. Of course, these supplies must be electrically insulated from each other so that an arc may be struck between the free streams 89—90 issuing therefrom. To assure a uniform flow of the liquids thus supplied, I provide pressurizing means 91 for each of the reservoirs 87—88. The materials supplied at streams 89—90 may be sufficient to provide the desired reaction at the elevated temperatures achieved upon application of arcing potentials from the power supply 92, and in that event it may not be necessary to supply a gas to the reaction chamber. On the other hand, it may be desirable to supply an inert gas or a gas to react with the vaporized electrodes. I, therefore, show a pressurized gas supply 93 with regulating-valve means 94 for feeding a constant flow of gas to the reaction chamber.

It will be seen that I have described relatively simple methods and apparatus for establishing reaction regimes for the promotion of chemical reactions. These regimes are characterized by heat development far exceeding that of prior reactions. Because the electrode or electrodes are completely consumed, and because the reaction zone need not be in immediate proximity to the walls of the reactor, it is possible to achieve extreme purity of ultimate product. I have described the invention particularly as a means for achieving oxide products, and I have made reference to two products that result from strongly exothermic reactions. The invention is, however, equally applicable to endothermic reactions and to the production of end products other than oxides. In particular, the high-heat reaction, resulting in vaporizing electrode materials, may establish an ionized region wherein compounds may be dissociated so as to free radicals for combination with other elemental radicals which may be injected; the reaction product may thus represent, for example, the substitution of one metal for another in combination with a given radical.

While I have described the invention in detail in connection with certain preferred forms and methods, it will be understood that the invention is not so limited but that it is defined in the claims which follow.

I claim:

1. The method of reacting two different materials which are electrically conductive in their liquid states, which comprises developing independent free streams of said materials in the liquid state, and striking an electric arc between said streams, said arc being of sufficient intensity to completely consume said streams.

2. The method of reacting two different materials which are electrically conductive in their liquid states, which comprises developing an independent free stream of one of said materials in the liquid state, and striking an electric arc between said stream and the other material in the liquid state, said arc being of sufficient power to completely consume said stream.

3. The method of reacting two different materials, one of which is electrically conductive in its liquid state, which comprises developing two independent free continuously flowing liquid streams of said one material, striking an electric arc between said streams, and exposing the other of said materials in the zone of said arc, the power of said arc being sufficient to continuously and completely consume said streams.

4. The method of reacting a gas with another material which is electrically conductive in its liquid state, which comprises developing two independent free liquid streams of said other material, developing a flow of said gas between said streams, and continuously striking an electric arc between said streams the intensity of said arc being sufficient to completely consume said streams.

5. The method of claim 4, in which said streams are directed to converge in the direction of flow of said gas.

6. The method of reacting two different materials, one of which is electrically conductive in its liquid state, which comprises developing an independent free liquid stream of said one material, establishing a pool of said material in electrically insulated relation with said free stream, striking an electric arc between said pool and said stream, and exposing the other of said materials in the zone of said arc, said arc being of sufficient intensity to completely consume said stream.

7. The method of sustaining a reaction between two reacting materials, one of which is electrically conductive in the liquid state, which comprises developing two free liquid streams of said one material, developing an electric arc between said streams, feeding the other of said materials into the zone of said arc, monitoring the energy level of said arc at a level sufficient to completely consume said streams, and controlling the feed rate of said other material to said zone in accordance with the energy level of said arc.

8. The method of claim 7, in which the feed rate of said other material is controlled inversely as the energy level of said arc.

9. The method of claim 7, in which the feed rate of said other material is controlled directly as the energy level of said arc.

10. The method of sustaining a reaction between two reacting materials one of which is electrically conductive in the liquid state, which comprises developing two free liquid streams of said one material, developing an electric arc between said streams, feeding the other of said materials into the zone of said arc, monitoring the energy level of said arc, and controlling the input power to said arc in response to the monitored level in order to preserve a substantially constant energy level in said arc, said energy level being sufficient for continuous complete consumption of said streams.

11. The method of vaporizing a metal, which comprises developing two independent molten streams thereof, and striking an electric arc between said streams, said arc being of sufficient intensity to completely consume said streams.

12. The method of producing a metal oxide, which comprises developing two independent free liquid streams of substantially pure metal, supplying oxygen to the vicinity of said streams, and striking an electric arc between said streams, said arc being of sufficient intensity to completely consume said streams.

13. The method according to claim 12, in which the oxygen is available from air supplied to the zone of said arc.

14. The method of producing a pure metal oxide, which comprises confining a reaction zone, developing two independent free liquid streams of pure metal in said zone, supplying only pure oxygen in said zone, and striking an electric arc between said streams in said zone, said arc being of sufficient intensity to completely consume said streams.

15. The method of producing a mixture of two metal oxides, which comprises developing a first free liquid stream of a first metal and a second free liquid stream of a second metal, exposing said streams to oxygen, and striking an electric arc between said streams, said arc being of sufficient intensity to completely consume said streams.

16. The method of producing a mixture of two metal oxides, which comprises developing a first molten stream of a mixture of a first and a second metal, developing a second molten stream of metal including at least one of said first and second metals, exposing said streams to oxygen, and striking an electric arc between said streams, said arc being of sufficient intensity to completely consume said streams.

17. The method of producing finely comminuted litharge, which comprises developing two independent free streams of molten lead, exposing said streams to oxygen, and striking an electric arc between said streams, said arc being of sufficient intensity to completely consume said streams.

18. The method of producing finely comminuted zinc oxide, which comprises developing two independent free streams of molten zinc, exposing said streams to oxygen, and striking an electric arc between said streams, said arc being of sufficient intensity to completely consume said streams.

19. The method of reacting separate material supplies which are electrically conductive in their liquid state, which comprises developing at least three independent free liquid streams of said supplies, and striking a three-phase arc between said streams, said arc being of sufficient intensity to completely consume said streams.

20. The method of reacting two different materials, one of which is electrically conductive in its liquid state, which comprises developing three independent free liquid streams of said one material, striking a three-phase electric arc between said streams, said arc being of sufficient intensity to completely consume said streams, and exposing the other of said material in the zone of said arc.

21. The method of reacting two different materials, one of which is electrically conductive in its liquid state, which comprises developing an independent free liquid stream including said one material, positively polarizing said free stream with respect to a reference pole so as to establish a D.-C. arc between said stream and said pole, said arc being of sufficient intensity to completely consume said stream and exposing the other of said materials in the zone of said arc.

22. The method of sustaining a reaction between two materials one of which is electrically conductive in the liquid state, which comprises developing a free continuously flowing liquid stream of said one material, developing an electric arc to said stream, feeding the other of said materials into the zone of said arc, monitoring the energy level of said arc, and controlling the rate of flow of said one material in response to the monitored level in order to preserve a substantially constant energy level in said arc, said energy level being sufficient to completely consume said free stream.

23. A chemical reactor, comprising a wall for confining a reaction, two jet-discharge devices within said wall at spaced locations, said devices being adapted to discharge conductive liquid into the inner volume of said reactor, each of said devices including means for establishing electrical contact with an electrically conductive liquid discharged by each of said devices, and means for applying arcing potentials across said last-defined means.

24. In combination, a tubular reaction chamber, two discharge nozzles having discharge ends directed into the inner volume of said chamber at spaced locations, means for inducing a gaseous flow in predominantly one direction through said chamber, each said nozzle including electric-contact means for establishing separate electrical contact with conductive liquids in each nozzle, and means for applying arc potentials to said last-defined means.

25. A device according to claim 24, in which both said nozzles are at substantially the same longitudinal section of said chamber.

26. A device according to claim 24, in which both said nozzles are generally directed toward each other.

27. A device according to claim 24, in which both said nozzles are generally directed downstream in the sense of flow through said chamber.

28. In combination, an envelope defining a reaction chamber, two discharge nozzles directed to discharge within said chamber at substantially the same longitudinal section therein, two independent liquid reservoirs separately communicating with said nozzles, separate means for establishing electrical contact with liquids in said reservoirs, and means for applying arc potentials between said separate means.

29. In combination, an elongated tubular envelope defining a reaction chamber, two discharge nozzles spaced from each other and directed to discharge generally toward each other at essentially the same longitudinal section within said chamber, two independent reservoirs communicating respectively with said nozzles, conductive liquids in said reservoirs, whereby said nozzles will discharge free liquid streams, means for inducing a flow longtudinally down said chamber in one direction, and means for applying arc potentials between said respective liquids, whereby an arc will be struck between the free liquid streams defining a reaction zone, and collector means downstream from said zone.

30. The combination of claim 29, including pump means downstream from said collector for inducing a suction draft through said chamber.

31. The combination of claim 29, including a pump communicating with the inlet to said chamber for forcing a draft down said chamber.

32. The combination of claim 29, and including means for bleeding into the flow down said chamber a gas to be reacted in said zone, the bleed inlet being upstream from said zone.

33. The combination of claim 32, and including flow-control means for said bleed.

34. The combination of claim 29, and including heating means for said reservoirs.

35. In combination, an envelope defining a reaction chamber, two nozzles spaced from each other and directed to discharge within said chamber, two independent liquid reservoirs communicating respectively with said nozzles, separate means for establishing electrical contact with liquids discharging from said respective reservoirs and within said chamber, arc-power supply means connected across said last-defined means, whereby an arc may be struck between the free streams of said liquids in said chamber, power-metering means monitoring the power supplied to said arc and including a connection limiting to a substantially constant magnitude the power supplied to said arc.

36. In combination, an envelope defining a reaction chamber, two spaced nozzles directed to discharge into a reaction zone within said chamber, separate liquid reservoirs communicating respectively with said nozzles, flow-control means between one of said reservoirs and the discharge end of the nozzle connected thereto, power-supply means in electrical contact with liquid in each of said nozzles, power-metering means monitoring the power consumed in the arc struck between the free liquid streams discharged by said nozzles, and actuator means for said flow-control means responsive to the monitored power level.

37. In combination, an envelope defining a reaction chamber, two spaced nozzles directed to discharge into a reaction zone within said chamber, separate liquid reservoirs communicating respectively with said nozzles, separate flow-control means between said respective reservoirs and the discharge ends of the nozzles connected thereto, power-supply means in electrical contact with liquid in each of said nozzles, power-metering means monitoring the power consumed in the arc struck between the free streams discharged by said nozzles, and actuator means for said flow-control means responsive to the monitored power level.

38. In combination, an envelope defining a reaction chamber, two spaced nozzles directed to discharge into a reaction zone within said chamber, separate liquid reservoirs communicating respectively with said nozzles, means for applying arcing potentials between conductive liquids in said respective nozzles, whereby an arc may be struck between the free streams of said liquids in said zone, power-metering means monitoring the power level supplied to said arc, gas-flow-control means for passing a controlled flow of gas into the reaction zone of said chamber, and means controlling the rate of gas flow in response to said power-metering means.

39. In combination, an envelope defining a reaction chamber, two spaced discharge nozzles directed to discharge into a reaction zone within said chamber, two separate liquid reservoirs communicating respectively with said nozzles, an inert gas supply, means for developing a controlled flow of inert gas from said supply and into said reaction zone, and means for applying arc potentials between conductive liquids within said nozzles, whereby an arc may be developed between the free liquid streams discharged by said nozzles and in an inert atmosphere.

40. The combination according to claim 39, in which said inert gas supply includes a gas reservoir for pressurized inert gas and means for regulating the supply thereof to said chamber, and gas-recycling means collecting gas downstream from said reaction zone and including a pump for delivering the collected gas to said gas reservoir under pressure.

41. In combination, an envelope defining a reaction chamber, two spaced nozzles directed to discharge into a reaction zone within said chamber, two liquid reservoirs communicating respectively with said nozzles, means for applying arc potentials between conductive liquids in said respective nozzles, whereby an arc may be struck between the free liquid streams discharged by said nozzles, collector means for the products of reaction between said streams, and means for evacuating said envelope and said collector means.

42. Reaction-thrust-developing means, comprising a chamber with an exhaust outlet, separate electrically insulated reservoirs of an electrically conductive liquid, nozzle means communicating respectively with said reservoirs and adapted to discharge separate free liquid streams in a reaction zone of said chamber in the direction of the exhaust outlet, means for striking an electric arc between said liquid streams, and gas-supply means communicating with said chamber upstream from the discharge outlet thereof.

43. A chemical reactor, comprising means defining a chamber having a reaction zone therein, nozzle discharge means adapted to continuously discharge a free stream of electrically conductive liquid into said zone, a liquid reservoir means communicating with said nozzle discharge means, an electrode within said chamber, said electrode having an effective area substantially exceeding the discharge area of said nozzle discharge means, and means for applying arcing potentials between said liquid stream and said electrode.

44. In combination, an envelope defining a reaction chamber, two electric-pole systems associated with said chamber, each said pole system comprising a discharge nozzle and liquid-supply means therefore and including means for establishing electrical contact with liquid contained in said pole system, said nozzles being directed to discharge within said envelope at spaced locations and being directed generally toward each other, and means for applying an arcing potential from one to the other of said pole systems.

References Cited in the file of this patent

UNITED STATES PATENTS

| | | |
|---|---|---|
| 625,918 | Bailey et al. | May 30, 1899 |
| 1,958,406 | Darrah | May 15, 1934 |
| 2,734,244 | Herres | Feb. 14, 1956 |

FOREIGN PATENTS

| | | |
|---|---|---|
| 223,271 | Great Britain | Oct. 11, 1924 |